United States Patent
McGraw

(10) Patent No.: US 7,883,310 B2
(45) Date of Patent: Feb. 8, 2011

(54) ROLL-OFF TRUCK BED ADAPTER FOR USE WITH STANDARD FRONT LOAD CONTAINERS

(76) Inventor: Malcolm S. McGraw, 287 Kenduskeag Rd., Levant, ME (US) 04456

( * ) Notice: Subject to any disclaimer, the term of this patent is extended or adjusted under 35 U.S.C. 154(b) by 363 days.

(21) Appl. No.: 11/971,557

(22) Filed: Jan. 9, 2008

(65) Prior Publication Data

US 2009/0175712 A1 Jul. 9, 2009

(51) Int. Cl.
*B60P 1/22* (2006.01)
(52) U.S. Cl. .................. 414/491; 414/494; 414/555
(58) Field of Classification Search .............. 414/491, 414/494, 500, 555, 912
See application file for complete search history.

(56) References Cited

U.S. PATENT DOCUMENTS

| | | | |
|---|---|---|---|
| 3,643,993 A | 2/1972 | Asadurian | |
| 3,971,486 A * | 7/1976 | Carlsson | 414/493 |
| 3,987,918 A * | 10/1976 | Corompt | 414/494 |
| 4,278,390 A * | 7/1981 | Ahearn | 414/555 |
| 4,599,040 A | 7/1986 | Rasmussen | |
| 5,074,737 A | 12/1991 | Pellegrini et al. | |
| 5,114,304 A | 5/1992 | Edelhoff et al. | |
| 5,169,194 A | 12/1992 | Yamashita et al. | |
| 5,482,180 A | 1/1996 | Smith et al. | |
| 5,725,348 A | 3/1998 | Drake | |
| 5,741,107 A | 4/1998 | Georg | |
| 5,797,715 A | 8/1998 | Christenson | |
| 5,813,824 A | 9/1998 | Zanzig et al. | |
| 6,702,135 B2 | 3/2004 | Pickler | |
| 6,705,823 B2 * | 3/2004 | Bohata | 414/491 |
| 7,112,030 B2 | 9/2006 | Renziehausen | |
| 2005/0051545 A1 | 3/2005 | Estes | |
| 2008/0056870 A1 * | 3/2008 | Cullum et al. | 414/494 |

* cited by examiner

*Primary Examiner*—James Keenan
(74) *Attorney, Agent, or Firm*—Anthony D. Peilegrini, Esq.

(57) ABSTRACT

An adapter device to be used with a standard roll-off truck to allow said truck to lift and transport standard front-load containers; said adapter device comprising a rigid support structure adapted to engage with the bed of the roll-off truck; an engagement structure integrated with the support structure and adapted to be engaged by a hoist mechanism of the roll-off truck; and a lift structure integrated with the support structure and comprising a pair of parallel forks adapted to engage with the standard lift fittings of the front-load container.

12 Claims, 8 Drawing Sheets

PRIOR ART

PRIOR ART

ROLL-OFF TRUCK BED ADAPTER FOR USE WITH STANDARD FRONT LOAD CONTAINERS

BACKGROUND OF THE INVENTION

The present invention relates to the waste disposal industry. More particularly, the invention relates to an improvement in the use of specialized vehicles for the transport of standard waste disposal containers.

The waste management field has been standardized with regard to commercial waste disposal containers. The two most common types of containers are the roll-off container and the front-load container. The roll-off container is larger and typically used for large volumes of waste, such as construction debris, commercial and industrial refuse, bulk items, and the like. The front-load container is smaller and typically used for garbage, restaurant waste, packing materials, retail waste, and other refuse. The industry has also specialized with regard to the type of vehicle used to transport these waste disposal containers. A roll-off truck is specially designed to transport roll-off containers between the site where they are filled and a disposal site, and a front-load container truck is specially designed to transport front-load containers between the site where they are filled and a disposal site.

A roll-off truck has a tilting, flat bed and a hoisting mechanism, usually involving a winch and cable but alternatively involving a hydraulic arm, which is used to engage a roll-off container, or some other similar device. The bed incorporates rollers to facilitate the movement of a roll-off container over its surface. The rollers are recessed below the surface of the bed, and are designed to accommodate wheels or rails located on the underside of roll-off containers. See FIG. 1.

A roll-off container is typically constructed of a rigid metal material to standardized dimensions in a substantially rectangular configuration, formed of a bottom floor and four upwardly depending side walls and an open top, with a front to back length exceeding the side to side width. The roll-off container is designed with wheels or parallel rails on the underside of the bottom floor suitable for cooperative rolling engagement with the rollers on the beds of roll-off trucks. Roll-off containers are further designed with standard attachment fittings affixed to their front walls enabling them to be engaged by the hoisting mechanism of the roll-off truck. These attachment fittings are typically a hook or prong, over which a looped end of a cable may be placed, or a bar engageable by a hydraulic arm. Other attachment fitting designs are also used.

To load a roll-off container, the roll-off truck is backed up to the roll-off container, the bed of the roll-off truck is tilted, the hoisting mechanism is engaged with the attachment fitting of the roll-off container, and the roll-off container is drawn towards and onto the tilted truck bed. Then the bed is returned to a horizontal orientation for transporting the roll-off container. See FIG. 1. To unload the roll-off container, the truck bed is tilted and the hoisting mechanism is reversed, whereby the roll-off container slides downward and rearward off the truck bed.

A front-load container truck is smaller than a roll-off truck, and does not have a tilting bed. Rather, it comprises a lifting mechanism affixed to the rear of the truck, having a pair of hydraulically moveable, rearward depending parallel lifting arms which are used to engage a front-load container. See FIG. 2.

Front-load containers are typically constructed of a rigid metal material to standardized dimensions in a substantially rectangular configuration, formed of a bottom floor, four upwardly depending side walls, and a closed top. The front-load container is designed with a pair of standard lift fittings enabling them to be engaged by the lifting arms of the front-load container truck. These lift fittings are typically a pair of parallel sleeves affixed laterally to the sides of the front-load container, or integrated therewith. They may also be laterally depending flanges or other structures adapted to accommodate the lifting arms of the lifting mechanism of the front-load container truck.

To load a front-load container, the front-load container truck is backed up to the front-load container, the parallel lifting arms are hydraulically positioned so as to align with the lift fittings of the front-load container and then inserted therein (either by hydraulic extension or by the truck backing up), and then the lifting arms are hydraulically positioned to lift the front-load container, typically at a forward angle to prevent the front-load container from sliding off the lifting arms during transport. The front-load container is then transported by the front-load container truck. See FIG. 2. To unload the front-load container, the lifting arms are angled and lowered until the front-load container is placed onto a surface, and then the lifting arms are withdrawn from the lift fittings of the front-load container.

As is evident from the foregoing descriptions, the specially designed trucks for transporting the different types of waste disposal containers are incompatible with each other. A roll-off truck cannot transport a front-load container (unless another vehicle, such as a fork lift, is used to lift the front-load container onto and off of the bed of the roll-off truck), and a front-load container truck cannot be used to transport a roll-off container. Thus, a waste disposal company employing both types of waste disposal containers would need to have both types of specialized trucks. This results in great expense and inefficiency of operation with a corresponding economic burden on waste management fleets.

The prior art fails to solve this incompatibility problem. The art is replete with innovations in either roll-off containers and their corresponding trucks, or front-load containers and their corresponding trucks. However, there has never been addressed the problem of using a single standard vehicle for transporting both types of waste disposal containers. What is needed is a device that adapts a single truck for use with both standard types of waste disposal containers. The present invention satisfies this need by providing an adapter device for use with a standard roll-off truck that allows a standard roll-off truck to lift and transport a standard front-load container as well as a standard roll-off container.

It is therefore an objective of the present invention to provide an adapter device for use with a standard roll-off truck that allows a standard roll-off truck to lift and transport a standard front-load container.

It is a further objective of the present invention to provide an adapter device for use with a standard roll-off truck that obviating the need for a specialized front-load container truck or for a secondary assist vehicle, such as a fork lift, for lifting and transporting standard front-load containers.

It is yet a further objective of the present invention to provide an adapter device for use with a standard roll-off truck which is simple to attach to and remove from a standard roll-off truck.

It is yet a further objective of the present invention to provide an adapter device for use with a standard roll-off truck which requires no modification to a standard roll-off truck.

It is yet a further objective of the present invention to provide an adapter device for use with a standard roll-off truck which securely attaches a front-load container to a standard roll-off truck during transport.

It is yet a further objective of the present invention to provide an adapter device for use with a standard roll-off truck which is simple to manufacture.

It is yet a further objective of the present invention to provide an adapter device for use with a standard roll-off truck which is relatively inexpensive to purchase and own.

It is yet a further objective of the present invention to provide an adapter device for use with a standard roll-off truck that improves the efficiencies of a waste disposal truck fleet by allowing a single type of truck to handle both roll-off containers and front-load containers.

It is yet a further objective of the present invention to provide an adapter device for use with a standard roll-off truck that reduces the environmental impact of waste disposal vehicles by allowing said adapter device to remain at a waste collection site along with a front-load container for use by a standard roll-off truck without necessitating a return to a centralized location to procure same or to exchange the vehicle for a specialized front-load container truck.

Other objectives of this invention will be evident from the following disclosure.

SUMMARY OF THE INVENTION

The present invention is an adapter device to be used with a standard roll-off truck to allow it to lift and transport standard front-load containers. The adapter device comprises a rigid support structure adapted to be engaged by the hoist mechanism of a roll-off truck and further adapted to engage with the tilt bed of a roll-off truck. As such, the adapter device is loaded onto and off of the roll-off truck in the same manner as a standard roll-off container. The adapter device further comprises a lift structure comprising a pair of parallel forks integrated with the support structure, wherein the parallel forks are adapted to engage with the standard lift fittings of a front-load container. The lift structure is oriented at an angle to and in fixed relationship with the support structure of the adapter device. Correct positioning of the lift structure is achieved by appropriately positioning the support structure on the tilt bed of the roll-off truck and by raising and lowering the tilt bed. That is, the support structure is positioned more or less forward on the tilt bed by the hoist mechanism of the roll-off truck to achieve the proper height of the lift structure from the ground, and the tilt bed of the roll-off truck is raised appropriately to orient the lift structure substantially horizontally. The process of positioning the adapter device is achieved through use of the standard controls and mechanisms of the roll-off truck. Once a front-load container is engaged, the tilt bed may be lowered somewhat and the adapter device may be positioned further forward on the bed by the hoist mechanism, thereby lifting the front-load container off the ground and angling it forward towards the tilt bed. See FIG. 3. The weight of the front-load container holds it securely onto the lift structure during transport.

As described, a standard roll-off truck utilizing the adapter device of the present invention may be used to lift and transport front-load containers, without the need for a secondary assist vehicle. Thus, a standard roll-off truck with an adapter device may handle both roll-off containers and front-load containers. The adapter device is moreover simple to attach to and remove from a standard roll-off truck, using the same procedure as is used for loading and unloading a standard roll-off container. There is no need to modify a standard roll-off truck in any way in order to use the adapter device.

The adapter device itself need comprise no moving parts and is therefore inexpensive to manufacture, purchase, and maintain.

Other features and advantages of the invention are described below.

DETAILED DESCRIPTION OF THE INVENTION

Figure 1:
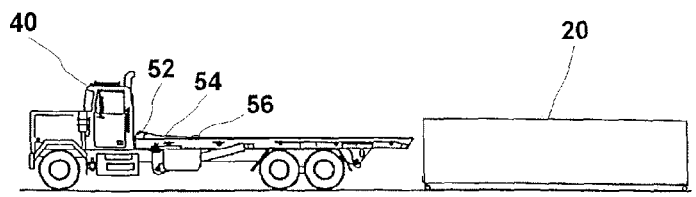
FIG. 1 depicts the process for loading and transporting a standard roll-off container using a standard roll-off truck, as is well-known in the art.
Figure 1:
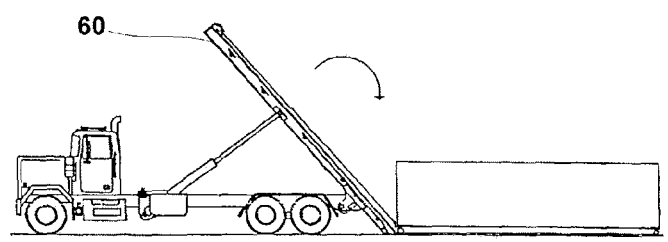
Figure 1:
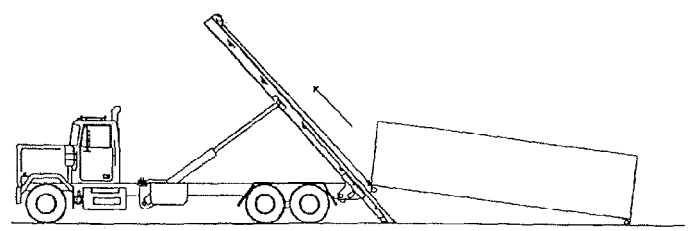
Figure 1:
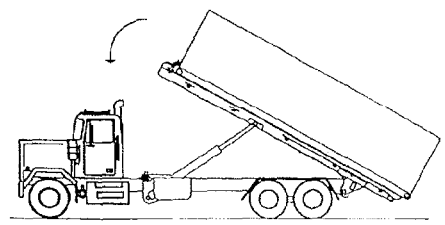
Figure 1:
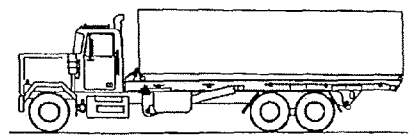
Figure 2:
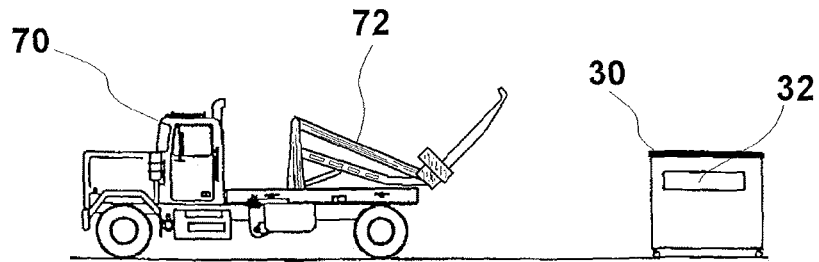
FIG. 2 depicts the process for loading and transporting a standard front-load container using a standard front-load truck, as is well-known in the art.
Figure 2:
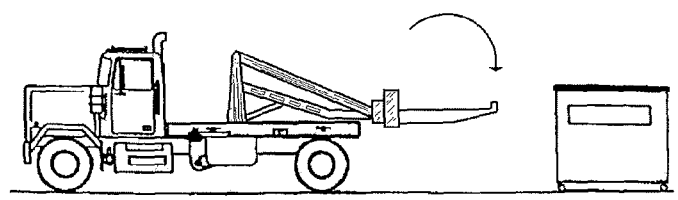
Figure 2:
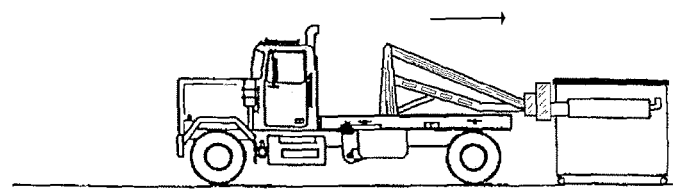
Figure 2:
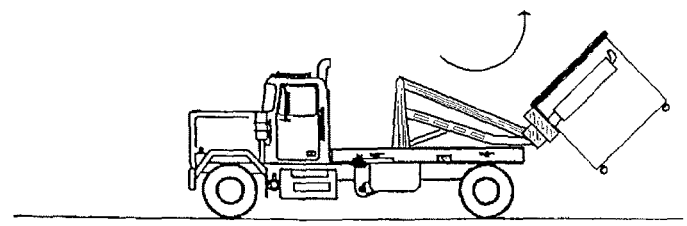

The present invention is an adapter device 10 to be used with a standard roll-off truck 40 to allow it to lift and transport standard front-load containers 30. The adapter device 10 comprises a rigid support structure 100, a lift structure 200, and an engagement structure 300. The support structure 100 is adapted to be engaged by the hoist mechanism 50 of a roll-off truck 40. It is further adapted to engage with the tilt bed 60 of a roll-off truck 40. The lift structure 200 is integrated with the support structure 100. It is adapted to engage with the standard lift fittings 32 of a front-load container 30 to lift the front-load container 30 off a surface for transport. The lift structure 200 is oriented at an angle to and in fixed relationship with the support structure 100. The engagement structure 300 is integrated with the support structure 100 and is suitably adapted to be engaged by the hoist mechanism 50 of the roll-off truck 40.

Figure 5:
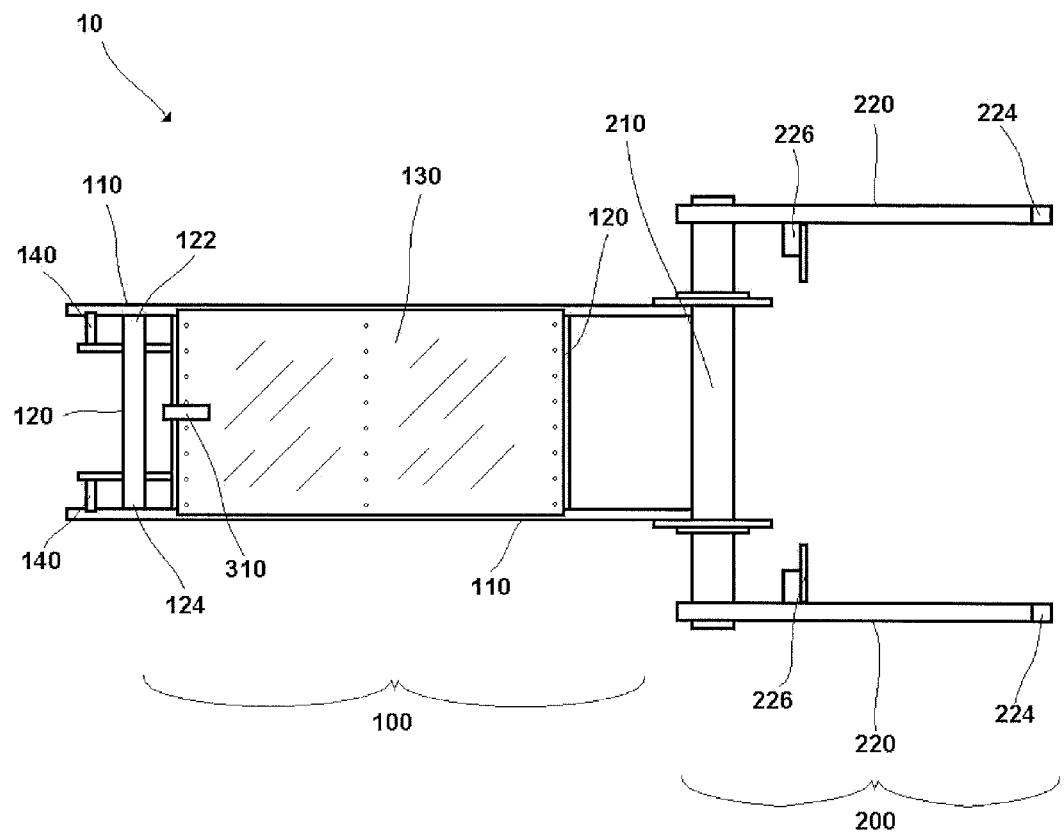
FIG. 5 is a plan top view of the present invention.
Figure 6:
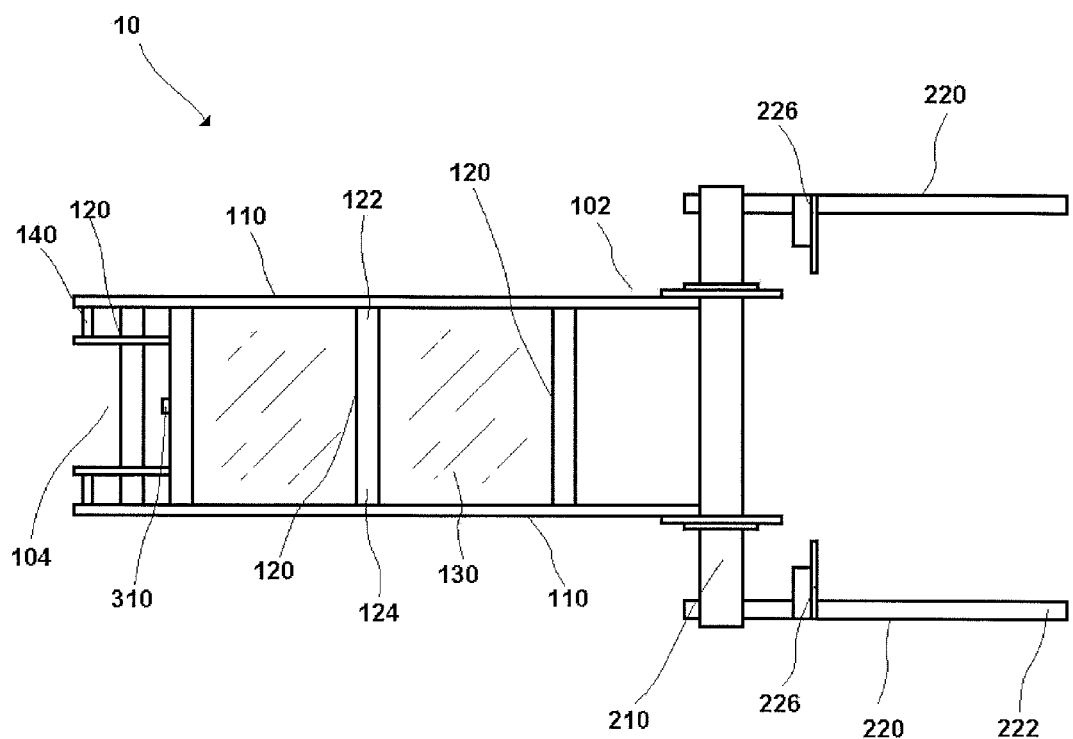
FIG. 6 is a plan bottom view of the present invention.

The support structure 100 of the adapter device 10 is minimally comprised of a pair of rails 110 and a plurality of cross-supports 120. See FIGS. 5 and 6. The rails 110 and cross-supports 120 are fixedly attached to each other to form a rigid frame. This frame is substantially rectangular, with a length front to back exceeding its width side to side. The support structure 100 has a first end 102 and a second end 104 at either end of its length, with the lift structure 200 located proximate to the first end 102 and the engagement structure 300 located proximate to the second end 104.

Figure 7:
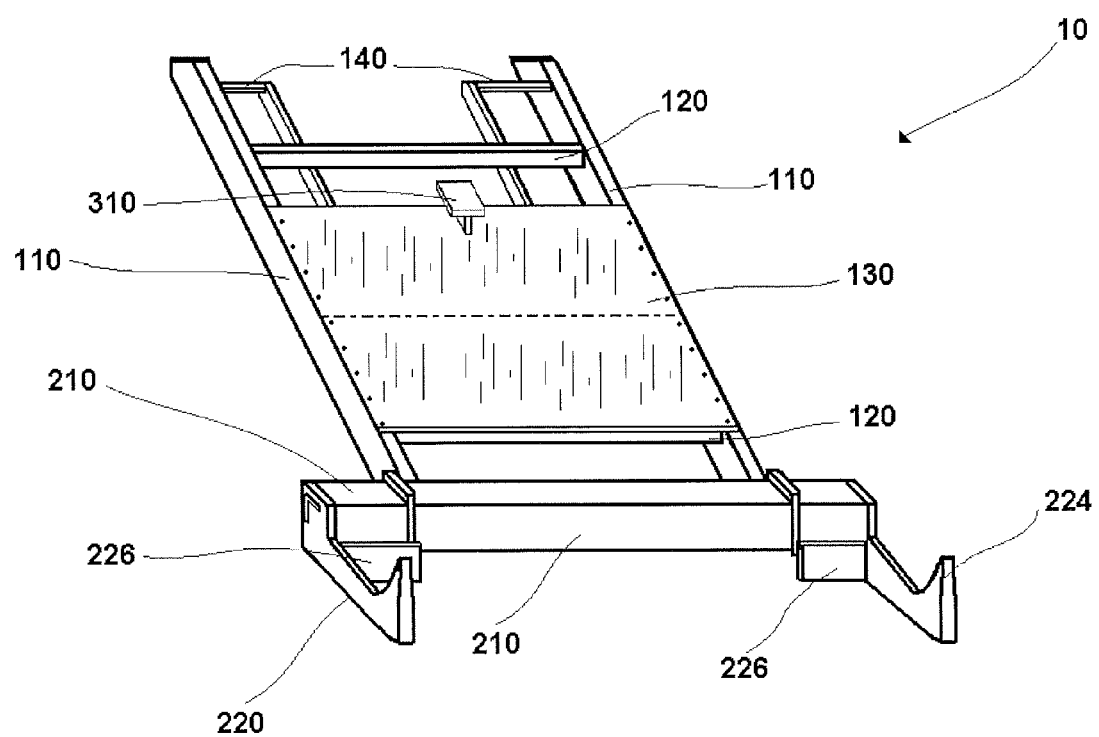
FIG. 7 is a perspective front view of the present invention.

The rails 110 are oriented longitudinally and are substantially parallel to each other. See FIGS. 6 and 7. The rails 110 are suitably adapted to engage with rollers integrated with the tilt bed 60 of the roll-off truck 40 such that the support structure 100 may be moveably engaged upon the tilt bed 60 of the roll-off truck 40. When the rails 110 are so engaged, the support structure 100 will be correctly positioned on the tilt bed 60 and will experience only minimal lateral movement in respect to the tilt bed 60. However, the support structure 100 is slidably moveable along the tilt bed 60 fore and aft. In the preferred embodiment the rails 110 are constructed of steel, and may be formed of I-beams, channel iron, or tube steel. In the most preferred embodiment both of the rails 110 are the same length.

The cross-supports 120 each have a first end 122 and a second end 124, with the first end 122 of each said cross-support 120 fixedly attached to one of the rails 110 and the second end 124 of each said cross-support 120 fixedly attached to the other of the rails 110. The cross-supports 120 may be attached by any known means, including by bolts, screws, or other fasteners. In the preferred embodiment the cross-supports 120 are attached to the rails 110 by welds. In one embodiment the cross-supports 120 may form a lattice between the rails 110. In the preferred embodiment each cross-support 120 is oriented substantially parallel to each other cross-support 120, and is oriented substantially perpendicular to each rail 110. See FIGS. 6 and 7. Other configurations of the rails 110 and cross-supports 120 are also contemplated. In the preferred embodiment the cross-supports 120 are constructed of steel, and may be formed of I-beams, channel iron, or tube steel.

In one embodiment of the invention the support structure 100 further comprises a top plate 130. See FIGS. 5 and 7. The top plate 130 may be fixedly attached to the cross-supports 120 or fixedly attached to the rails 110 or to both. The top plate 130 may be attached by any known means, including by bolts, screws, or other fasteners. In the preferred embodiment the top plate 130 is attached by welds. The top plate 130 provides additional rigidity to the support structure 100, minimizing flexing or bowing when the adapter device 10 is under load. In the preferred embodiment the top plate 130 is constructed of diamond plate steel. In the most preferred embodiment the top plate 130 is substantially rectangular and has a width substantially equal to the distance between the pair of rails 110 and a length not longer than the length of the rails 110, and a thickness of between one-quarter inch and three-quarter inches. Other configurations of the top plate 130 are also contemplated by the present invention.

In yet another embodiment of the invention the support structure 100 further comprises at least one roller stop 140. See FIGS. 5 and 7. Each roller stop 140 is located proximate to the second end 104 of the support structure 100. Each roller stop 140 is suitably adapted to arrest sliding movement of the adapter device 10 along the tilt bed 60 of the roll-off truck 40 when the adapter device 10 is engaged by the hoist mechanism 50 of the roll-off truck 40. That is, the hoist mechanism 50 can draw the adapter device 10 towards it until the one or more roller stops 140 come into contact with a portion of the tilt-bed 60 of the roll-off truck 40, at which point continued movement of the adapter device 10 in that direction ceases. The one or more roller stops 140 thus prevent the adapter device 10 from accidentally being drawn too close to the hoist mechanism 50 and potentially damaging it. In one embodiment the roller stops 140 are oriented horizontally, substantially perpendicular to the pair of rails 110. Other configurations of the roller stops 140 are also contemplated. In the preferred embodiment the roller stops 140 are constructed of steel, and may be formed of I-beams, channel iron, or tube steel.

With the support structure 100 configured as described herein, the underside of the support structure 100 is intended to be analogous to and provide a similar function as the underside of the bottom of a standard roll-off container 20, though the structures need not be identical. As such, the adapter device 10 may be loaded onto and unloaded from a roll-off track 40 in the same manner as a standard roll-off container 20.

The lift structure 200 of the adapter device 10 is fixedly attached to the support structure 100 proximate to a first end 102 of the support structure 100. The lift structure 200 is comprised of a lift cross member 210 and a pair of substantially parallel lift forks 220 fixedly attached to and depending from the lift cross member 210. See FIGS. 5, 6, and 7. The lift cross member 210 is fixedly attached to the first end 102 of the support structure 100. The lift cross member 210 may be attached by any known means, including by bolts, screws, or other fasteners. In the preferred embodiment the lift cross member 210 is attached to the support structure 100 by welds. The lift cross member 210 is oriented substantially perpendicular to the pair of rails 110. See FIGS. 6 and 7. In the preferred embodiment the lift cross member 210 has a length that is longer than the distance between the pair of rails 110, such that the ends of the lift cross member 210 depend laterally from the rails 110, thus forming a "T" with the first end 102 of the support structure 100. See FIGS. 6 and 7. In the preferred embodiment the lift cross member 210 is constructed of steel.

Figure 3:
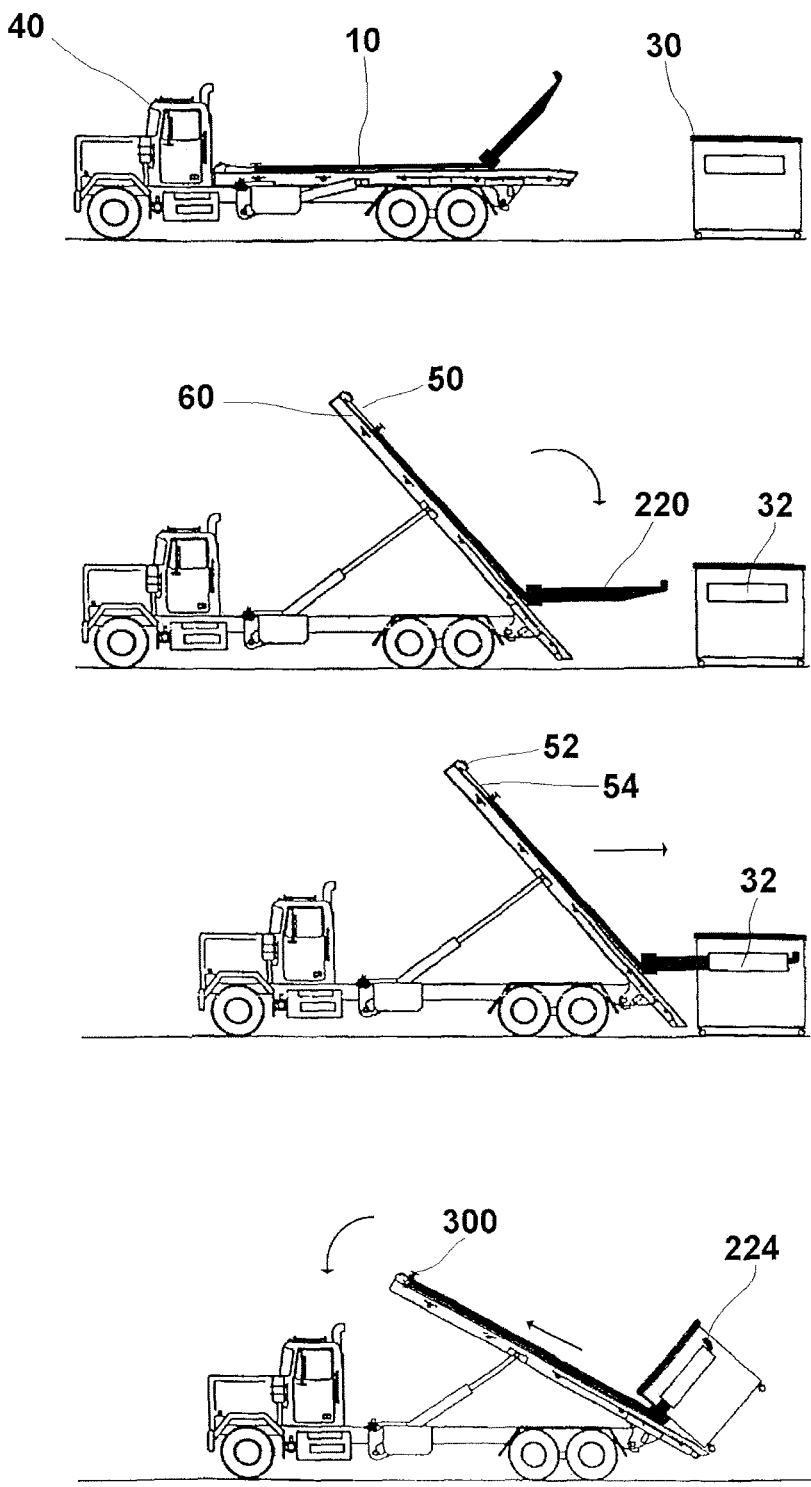
FIG. 3 depicts the process for loading and transporting a standard front-load container using a standard roll-off truck utilizing the adapter device of the present invention.
Figure 4:
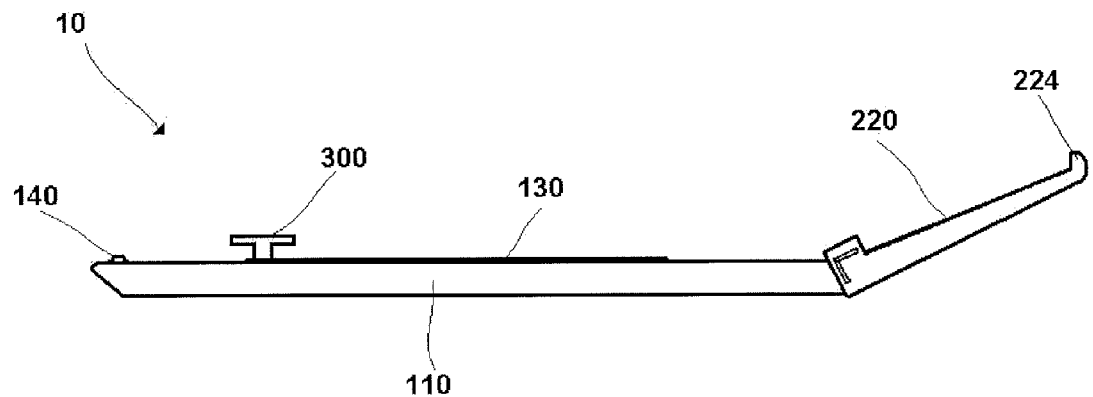
FIG. 4 is a plan side view of the present invention.

The pair of lift forks 220 are adapted to engage with a corresponding pair of lift fittings 32 of a front-load container 30. See FIG. 3. The lift fittings 32 are typically a pair of parallel sleeves, each affixed laterally to a side of the front-load container 30, or integrated therewith. They may also be laterally depending flanges or other structures serving the same purpose. In the preferred embodiment each lift fork 220 is tapered towards its distal end 222, thereby allowing the end 222 to more easily slide into and through its corresponding lift fitting 32. See FIG. 4.

The lift forks 220 are oriented at an angle to and in fixed relationship with the support structure 100. See FIG. 4. Thus, correct positioning of the lift forks 220 is achieved by appropriately positioning the support structure 100 on the tilt bed 60 of the roll-off truck 40, and by raising and lowering the tilt bed 60. That is, the lift forks 220 are not independently positioned relative to the support structure 100, but rather are positioned along with the support structure 100 by the existing mechanisms of the roll-off truck 40. The tilt bed 60 of the roll-off truck 40 is tilted appropriately to orient the lift forks 220 substantially horizontally for engagement with the lift fittings 32 of the front load container 30. The support structure 100 is positioned more or less forward on the tilt bed 60 by the hoist mechanism 50 of the roll-off truck 40 to achieve the proper height of the lift forks 220 from the ground. Once the front load container 30 is engaged onto the lift forks 220, the support structure 100 is positioned somewhat more forward on the tilt bed 60 by the hoist mechanism 50, thereby lifting the front load container 30, and the tilt bed 60 of the roll-off truck 40 is lowered somewhat to orient the lift forks 220 somewhat forward, at an angle to the horizontal, such that the front load container 30 tends to move away from the ends 222 of the lift forks 220 and towards the tilt bed 60 of the roll-off truck 40. See FIG. 3. This configuration of the lift structure 200 eliminates the need for the independent positioning means of the lift mechanism 72 found on a typical front-load container truck 70, greatly simplifying the overall design of the device 10 and minimizing the expense of manufacture and maintenance.

In the preferred embodiment each lift fork 220 comprises a fork hook 224 at the distal end 222. See FIGS. 4 and 7. Each said fork hook 224 depends in a substantially upward direction from the end 222 of its corresponding lift fork 220. The fork hooks 224 prevent the front load container 30 from easily sliding over the ends 222 of the lift forks 220 during transport, thereby increasing the safety of the device 10. In the most preferred embodiment the fork hook 224 is formed from the end 222 of the lift fork 220, with the lift fork 220 and fork hook 224 together formed of a monolithic portion of steel. In other embodiments the fork hook 224 may be fixedly attached to the end 222 of the lift fork 220.

In another embodiment each lift fork 220 comprises a container stop 226. See FIGS. 5, 6, and 7. Each container stop 226 is fixedly attached to its corresponding lift fork 220 and depends outward from the lift fork 220. The container stops 226 are located on their corresponding lift forks 220 at substantially the same distance from the lift cross member 210. Each container stop 226 is suitably adapted to support the weight of the front-load container 30 and to prevent the front-load container 30 from sliding along the lift forks 220 beyond the container stops 226 all the way to the lift cross member 210. Use of container stops 226 assists with orienting the front load container 30 more properly onto the lift structure 200 and also prevents the front load container 30 from damaging the support structure 100 or from being damaged by the support structure 100. In one embodiment the container stops 226 may be covered with a resilient material, such as rubber, to better cushion the front load container 30.

The engagement structure 300 of the adapter device 10 is fixedly attached to the support structure 100 proximate to the second end 104 of the support structure 100. See FIG. 4. The engagement structure 300 suitably adapted to be engaged by the standard hoist mechanism 50 of a roll-off truck 40. When the hoist mechanism 50 is engaged with the engagement structure 300 the hoist mechanism 50 is used to position the adapter device 10 on the tilt bed 60 of the roll-off truck 40. The engagement structure 300 may take any form suitable for its intended purpose. It may be one or more hooks, prongs, bars, rings, cable loops, or any other similar structure. It need only provide a secure attachment point to the support structure 100. The engagement structure 300 may be attached to the support structure 100 by any known means, including by bolts, screws, or other fasteners. In the preferred embodiment the engagement structure 300 is constructed of steel and attached by welds.

In the most common configuration of a roll-off truck 40, the hoist mechanism 50 comprises a powered winch 52 and a cable 54. The cable 54 has a loop 56 formed into its free end. In this configuration the engagement structure 300 is a projection over which the loop 56 may be securely placed. In the preferred embodiment to be used with this configuration, the engagement structure 300 is a hook 310. See FIGS. 4, 5, and 7. The hook 310 may be angled or curved.

Figure 8:
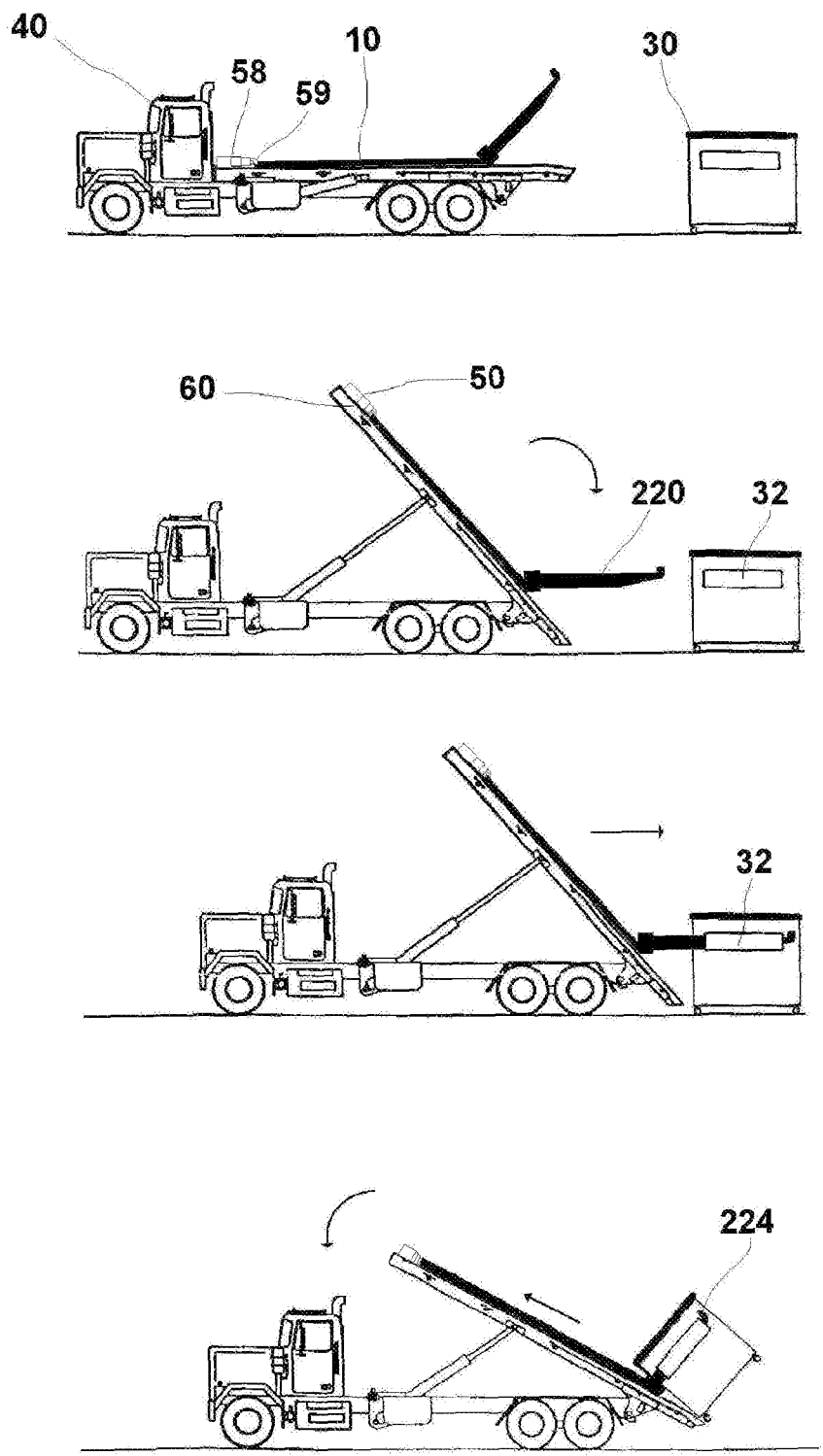
FIG. 8 depicts the process for loading and transporting a standard front-load container using a standard roll-off truck having a hydraulic hoist, utilizing the adapter device of the present invention.

In another common configuration of a roll-off truck 40, the hoist mechanism 50 comprises a hydraulic arm 58. See FIG. 8. The hydraulic arm 58 has a mechanical grip 59 at its free end. In this configuration the engagement structure 300 is a projection suitably adapted to be engaged by the mechanical grip 59. In the preferred embodiment to be used with this configuration, the engagement structure 300 is a grab bar. The grab bar may be oriented either substantially horizontally or substantially vertically. Other configurations of the engagement structure 300 are also contemplated.

From the foregoing description of the present invention its utility is evident. The simplicity of its design allows for easy and low cost manufacture, especially in relation to the specialized hydraulically powered lift mechanisms 72 of standard front load container trucks 70. This enables waste disposal fleets to be retrofitted with the present invention to greatly increase the utility of standard roll-off trucks 40 at low cost. Small operators can use the present invention with a single truck to serve customers using both types of standard containers. Not only is it simple to manufacture the adapter device 10 of the present invention, but it is simple to use it. It requires no modification to a standard roll-off truck 40. It uses the already existing controls and mechanisms of a standard roll-off truck 40 for positioning. These features make the present invention very attractive and allow it to fill an important niche in the waste disposal field.

Those skilled in the art will perceive improvements, changes and modifications in the invention. Such improvements, changes and modifications within the skill of the art are intended to be covered by the claims set forth herein, and that all matter contained in the accompanying specification shall be interpreted as illustrative only and not in a limiting sense.

I claim:

1. An adapter device for use with a roll-off truck, said device comprising
    a support structure, said support structure having
        a pair of rails, said rails oriented longitudinally and substantially parallel to each other, wherein said rails are suitably adapted to engage with rollers integrated with a tilt bed of the roll-off truck such that the support structure may be moveably engaged upon the tilt bed of the roll-off truck; and
        a plurality of cross-supports, each said cross-support having a first end and a second end, with the first end of each said cross-support fixedly attached to one of the rails and the second end of each said cross-support fixedly attached to the other of the rails;
    a lift structure, said lift structure fixedly attached to the support structure proximate to a first end of the support structure such that said lift structure is oriented at an angle to and in fixed relationship with said support structure,
    said lift structure having
        a lift cross member; and
        a pair of substantially parallel lift forks fixedly attached to and depending from the lift cross member, said lift forks oriented at an angle to and in fixed relationship with the support structure, wherein the lift forks are adapted to engage with a pair of lift fittings of a front-load container; and
    an engagement structure, said engagement structure fixedly attached to the support structure proximate to a second end of the support structure, said engagement structure suitably adapted to be engaged by a hoist mechanism of the roll-off truck such that the hoist mechanism may be used to position the adapter device on the tilt bed of the roll-off truck when the hoist mechanism is engaged with the engagement structure.

2. The device of claim 1 wherein the support structure further comprises a top plate, said top plate fixedly attached to the cross-supports.

3. The device of claim 2 wherein the top plate is constructed of diamond plate steel.

4. The device of claim 1 wherein the support structure further comprises a top plate, said top plate fixedly attached to the rails.

5. The device of claim 4 wherein the top plate is constructed of diamond plate steel.

6. The device of claim 1 wherein the support structure further comprises at least one roller stop, each said roller stop located proximate to the second end of the support structure,
    whereby each said roller stop is suitably adapted to arrest sliding movement of the adapter device along the tilt bed of the roll-off truck when the adapter device is engaged by the hoist mechanism of the roll-off truck.

7. The device of claim 1 wherein the rails and the cross-supports are each constructed of one of the following group: I-beam, channel iron, and tube steel.

8. The device of claim 1 wherein each cross-support is oriented substantially parallel to each other cross support and is oriented substantially perpendicular to each rail.

9. The device of claim 1 wherein each lift fork comprises a fork hook at an end of the lift fork opposite the lift cross member, with each said fork hook depending in a substantially upward direction from the end of its corresponding lift fork.

10. The device of claim 1 wherein each lift fork comprises a container stop, each said container stop being fixedly attached to its corresponding lift fork and depending outward from said lift fork, with the container stop of each lift fork located on its corresponding lift fork at a distance from the lift cross member substantially the same as the distance of the other container stop from the lift cross member, whereby each container stop is suitably adapted to support the front-load container and to prevent the front-load container from sliding along the lift forks all the way to the lift cross member.

11. The device of claim 1 wherein the hoist mechanism comprises a winch and a cable, said cable having a loop formed into a free end, and the engagement structure is a hook suitably adapted to be engaged by the cable loop.

12. The device of claim 1 wherein the hoist mechanism comprises a hydraulic arm, said hydraulic arm having a grip at a free end, and the engagement structure is suitably adapted to be engaged by the arm grip.

* * * * *